(12) United States Patent
Tikka

(10) Patent No.: US 6,542,501 B1
(45) Date of Patent: Apr. 1, 2003

(54) SPEECH TRANSMISSION IN A MOBILE COMMUNICATION NETWORK

(75) Inventor: Mauri Tikka, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/117,371

(22) PCT Filed: Jan. 28, 1997

(86) PCT No.: PCT/FI97/00043

§ 371 (c)(1),
(2), (4) Date: Jul. 28, 1998

(87) PCT Pub. No.: WO97/28664

PCT Pub. Date: Aug. 7, 1997

(30) Foreign Application Priority Data

Jan. 29, 1996 (FI) .................................................. 960404

(51) Int. Cl.[7] ............................. H04J 3/22; H04L 12/56
(52) U.S. Cl. ...................................... 370/389; 370/395.1
(58) Field of Search ................................ 370/349, 389, 370/395.1, 467, 470, 471, 472

(56) References Cited

U.S. PATENT DOCUMENTS

| 5,130,985 | A | * | 7/1992 | Kondo et al. ............... 370/94.1 |
| 5,299,198 | A | * | 3/1994 | Kay et al. ................... 370/95.3 |
| 5,434,854 | A | | 7/1995 | Focarile et al. |
| 5,487,065 | A | | 1/1996 | Acampora et al. |
| 5,692,105 | A | * | 11/1997 | Leppanen et al. .......... 395/2.94 |
| 5,781,540 | A | * | 7/1998 | Malcolm et al. ............ 370/321 |
| 5,812,951 | A | * | 9/1998 | Ganesan et al. ............ 455/445 |

FOREIGN PATENT DOCUMENTS

| EP | 544 217 | 6/1993 |
| EP | 679 042 | 10/1995 |
| EP | 708 576 | 4/1996 |
| GB | 2 268 359 | 1/1994 |
| GB | 2 276 292 | 9/1994 |
| WO | 93/19559 | 9/1993 |
| WO | WO 94/11975 | 5/1994 |

* cited by examiner

*Primary Examiner*—Alpus H. Hsu
*Assistant Examiner*—Toan Nguyen
(74) *Attorney, Agent, or Firm*—Pillsbury Winthrop LLP

(57) ABSTRACT

A digital mobile communication network and a switching system for a digital mobile communication network are provided. A traffic frame may include speech signals converted into a parameter group by a speech encoder and, as a whole, may be inserted into a payload part of a data packet. The data packet can be sent to a destination via a transmission network. At the destination, the traffic frame is separated from the payload of the received data packet and the traffic frame is passed to a transcoder unit for restoring the original speech signal. The transmission network can be an asynchronous transfer mode network and the data packet can be an asynchronous transfer mode cell.

6 Claims, 5 Drawing Sheets

SPEECH TRANSMISSION IN A MOBILE COMMUNICATION NETWORK

This application is the national phase of international application PCT/FI97/00043 filed Jan. 28, 1997 which designated the U.S.

FIELD OF THE INVENTION

The present invention relates to speech transmission in a packet network and especially to transmission between a transcoder and a base station of a mobile communication network.

BACKGROUND OF THE INVENTION

In a digital telephone system a speech signal is encoded in some manner before it is channel coded and sent to the radio path. In speech coding digitalized speech is processed frame by frame at intervals of about 20 ms by using different methods so that it results in a parameter group representing speech for each frame. This information, that is, the parameter group is channel coded and sent to the transmission path. The used speech coding algorithms are RPE-LTP (Regular Pulse Excitation LPC with Long Term Prediction) and various code excited algorithms CELP (Code Excited Linear Prediction) of which VSELP (Vector-Sum Excited Linear Prediction) should be mentioned. Encoders using varying algorithms have it in common that an encoder produces speech frames of 20 ms in duration.

In addition to actual coding, the following functions are also built in for speech processing: a) on the transmitter side Voice Activity Detection VAD with which the transmitter can be instructed to be switched on only when there is speech to be sent (Discontinuous Transmission, DTX), b) on the transmitter side the evaluation of background noise and the generation of respective noise parameters and on the reception side the generation of comfort noise in a decoder from the noise parameters, and c) acoustic echo suppression. Noise during a break makes the connection sound more pleasant than absolute silence.

In known GSM mobile telephone systems the input of a speech encoder is either a PCM signal of 13 bits from the network or an AND converted PCM of 13 bits from the audio part of the mobile station. The speech frame obtained from the output of the encoder is 20 ms in duration and comprises 260 audio bits which are formed by encoding 160 of PCM-encoded speech samples. Voice activity detection (SAD) defines from the parameters in the speech frame whether the frame contains speech or not. If speech is detected, the frames transmitted to the radio path as so-called traffic frames are speech frames. After a speech burst, and at specified intervals also during the speech breaks indicated by the VAD, the traffic frames are SID frames (Silence Descriptor) containing noise parameters, in which case the receiver is able to generate from these parameters noise similar to the original noise also during breaks.

A traffic frame thus contains a speech block of 260 bits representing 20 ms of encoded speech/data or noise. Furthermore, the frame has 56 bits available for frame synchronization, speech and data indication, timing and other information, the total length of the traffic frame being 316 bits. Traffic frames in the uplink and downlink direction differ from one another only in these 56 bits.

Referring to FIG. 1, which shows a simplified view of the present GSM network from the point of view of transmission. Network Subsystem comprises a mobile service switching centre, the mobile communication network being connected via the system interface of the mobile services switching centre to other networks than Public Switched Telephone Network PSTN. Via A interface the network subsystem is connected to the base station subsystem BSS comprising base station controllers, each of which controls base stations BTS connected thereto. The interface between the base station controller and the base stations connected thereto is an Abis interface. The base stations are in radio communication with mobile stations via the radio interface. Traffic frame forming unit TRAU explained above is in FIG. 1 placed in association with the base station but is may also be situated in association with the mobile services switching centre.

The mobile services switching centre MSC is shown in a simplified way in FIG. 2. Control of the base station system BSS is one function of the mobile services switching centre in addition to a call control. The function of the switching matrix is to select, switch and separate speech/data and signaling paths passing through it in the desired way. The switching matrix switches in this way its part of the connection between a mobile subscriber and a subscriber of another network and of the connection between two mobile subscribers. The function of the Network Interworking Functions IWF 1 is to adapt the GSM network into other networks. The PCM trunk line is connected to a PBX system by a terminal circuit trunk interface 3 so that the physical interface of layer 1 between the exchange and the base station controller BSC is a line of 2 Mbit/s, that is, 32 time slots of 64 kbit/s (=2048 kbit/s). The signaling terminal 4 carries out signaling according recommendation CCITT No:7.

The functions of the base station controller indicated with reference 14 in FIG. 1 include selection of a channel between it and the mobile station, link control and channel release. It carries out mapping from the radio channel to the channel of the PCM time slot of the interconnecting line between the base station and the base station controller. The base station controller shown in a simplified way in FIG. 3 comprises terminal circuits, trunk interfaces 31 and 32 by means of which the base station controller is connected on the one hand to the mobile services switching centre over the A interface and on the other hand to the base stations over the Abis interface. Transcoder and Rate Adaptation Unit TRAU is part of the base station system BSS and it may be situated in association with the base station controller BSC as shown in FIG. 1 or also in association with the mobile services switching centre. The transcoders convert speech from one digital format to another, they for example convert the 64 kbit/s A-law PCM from the exchange over the A interface into encoded speech of 13 kbit/s to be sent to the base station line and vice versa. The rate adaptation for the data is carried out in between the rate 64 kbit/s and the rates 3.6, 6 or 12 kbit/s.

The base station controller BSC configures, allocates and supervises the circuits of 64 kbit/s in the direction of the base station. It also controls the switching circuits of the base station by means of the PCM signaling link and allows the circuits of 64 kbit/s to be used efficiently, that is, a switch at the base station, which the base station controller controls, switches transmitter/receivers to PCM links. This switch hence operates as a drop/insert multiplexer which drops a PCM time slot for the transmitter of data or inserts a reception time slot to a PCM time slot of data or links the PCM time slots forwards to other base stations. The base station controller thus sets up and releases connections to the mobile station. The connections from the base stations to the PCM line/lines over the A interface and the procedure in the opposite way are multiplexed in a switching matrix 33.

The physical interface of layer 1 between the exchange and the base station controller BSC is a line of 2 Mbit/s, that is, 32 time slots of 64 kbit/s (=2048 kbit/s). The base station is totally controlled by the base station controller BSC and it mainly contains transmitter/receivers TRX which implement the radio interface towards the mobile station. Four full rate traffic channels via the radio interface can be multiplexed into one PCM channel of 64 kbit/s between the base station controller and the base station, in which case the rate of the speech/data channel is in this interval 16 kbit/s. In that case one PCM link of 64 kbit/s can transmit four speech/data connections.

FIG. 1 illustrates the transmission rates used in the GSM for a channel. The mobile station sends speech or data information over the radio interface on the radio channel as traffic frames. A base station 13 receives the information and transmits it to the time slot of 64 kbit/s of the PCM line. The other three traffic channels of the same carrier wave are also inserted in the same time slot, that is, the channel, so that the transmission rate for a connection is 16 kbit/s. In a base station controller 14 the transcoder/rate adaptation unit TRAU converts the rate 16 kbit/s of the encoded digital information into the rate 64 kbit/s and at this rate the data is transmitted to the mobile services switching centre after which, subsequent to possibly necessary modulation and rate modification, the information is transmitted to some other network.

In accordance with the foregoing explanation, the base station controller selects the circuits with which the connection is provided between it and the transmitter/receivers of the base station. The radio channel (TDMA time slot) and the PCM time slot of the line between the base station and the base station controller has during the connection a one-to-one correspondence, that is, in the uplink direction the information of a specified time slot of a specified carrier wave is always inserted in the same PCM channel of 16 kbit/s and correspondingly, in the downlink direction this information of the PCM channel is transmitted to the same TDMA time slot.

The base station controller signals to the base station which base station of the TDMA time slot has to be bound to which PCM channel. In that way the base station controller alone allocates the channel through the Abis interface and radio interface as far as the mobile station. When the base station has allocated a channel as far as the mobile station, a mobile services switching centre 15 selects the circuit with which the connection between the mobile services switching centre and the base station controller/TRAU is generated, that is, the circuits towards the A interface of the exchange and the base station controller. At the end the generated links are connected to each other.

Data transmission standard ATM (Asynchronous Transfer Mode) has been introduced for combinations of narrow band and broad band implementations and for transmission of packets and signaling. It is a connection-oriented packet switching technique which the international telecommunication standardization organization ITU-T has chosen as an implementation technique of Broadband Integrated Services Digital Network (B-ISDN). In the ATM data is packed in frames which comprise several packets of a constant length known as cells. A cell is 53 bytes in length and a cell comprises a header of 5 bytes in length and 48 bytes have been reserved for a payload. When an ATM segment is sent, each of its cells can be directed to different directions as the destination of the cell is indicated in the header.

ATM technique is best suited for use in broadband networks, especially in transmission networks using fibre optics. It is therefore probable that in the mobile communication network the present PCM technique using trunk lines of 2 Mbit/s, which the mobile operator has often hired from other teleoperators, will be replaced with ATM technique. It is necessary to operate in this way especially if the transmission capacity of the radio path is increased so much that the present PCM connection alone is no longer sufficient. In that case the data transmission capacity and the rate of the mobile communication network would increase considerably. It is also possible that the premises where the new base station is positioned already have an existing ATM connection in which case it would be tempting to use it.

Speech transmission in ATM cells has become a problem. In present circuit-switched connections speech transmission is very fast and delays hardly ever cause problems. Instead, it has become a problem how to manage transmission delays when various audio signals to the network from any of the several input points are transmitted by the ATM technique to any of the numerous output points of the network. It is a particular problem how to transmit audio signals converted as PCM encoded and multiplexed in PCM devices between the nodes of the network and across the network, which network contains ATM transfer devices and exchanges.

The solutions given to this problem are at least the following a) use of microcells, b) incomplete filling of cells, and c) emulation of circuit switching.

When micro cells are used, several speech channels are multiplexed for transporting one ATM cell. It is a problem with the micro cell technique is that the ATM cell is no longer the basic unit of switching in which case ordinary ATM switching devices cannot be used to switch speech channels but special arrangements and devices are needed for releasing speech channels inside the microcells. In incomplete filling of ATM cells, the payload of the cell is left incomplete. In this way the capacity is underused but it has to be done if delays are to be avoided. In emulation of circuit switching, information moving on the PCM line of 2 Mbit/s is transmitted transparently in one ATM cell flux. A disadvantage of this method is that transmission capacity is always reserved regardless of whether there are calls to be transmitted or not, wherefore transmission of empty cells cannot be avoided. Another disadvantage is that speech channels of the connection of the point-to-point nature cannot be connected/switched with ATM equipments inside the network into different directions.

Patent Application WO 94/11975 discloses a method, a telecommunication network and a switching system for transmitting several PCM encoded speech channels through the ATM network. The method includes features of steps a and c mentioned above. According to the application several speech channels assigned for the same output node of the ATM network are packed in one ATM cell, whereby sound and narrowband data channels are transmitted in these cells which are transmitted at a reproducing rate which is the same or an integral part of the reproducing rate of sound-containing PCM signal. Cells are transmitted in the network between the input node and the output node via virtual circuits maintaining a constant rate. When there are no great changes in the traffic so that permanent virtual paths need to be added between two nodes or deleted, the switching system carries out a simple function: a frame of PCM samples at the input point of 125 microseconds in duration, inserted in one ATM cell is routed through the network to the output node which means that cells are sent at intervals of 125 milliseconds. One PCM sample comprises one byte, wherefore 48 speech channels at the maximum can be transmitted in one cell. If the capacity of the PCM channel is more than 64 kbit/s, e.g. 384 kbit/s, more bytes are used of the cell for one channel, for example 6 bytes.

None of the above explained methods is as such suitable when the transmission of audio information of PCM channel between the base station and TRAU is replaced with the ATM connection in order that speech information can be transmitted, when required, directly from one base station to another without the connection passing through the TRAU or the mobile services switching centre as in the present GSM system.

SUMMARY OF THE INVENTION

The object of the present invention is thus a method by means of which speech comprising speech frames generated from a PCM encoded speech signal of the speech encoder can be transmitted without a disadvantageous delay in a packet network, such as the ATM network. A particular object is a method by means of which speech can be transmitted in packet mode between a base station and a TRAU and two base stations in the mobile communication system.

The object is attained with the method and the digital mobile communication network according to claims 1 and 4.

A digitalized speech signal is converted frame by frame in a speech encoder into a parameter group which is inserted in a traffic frame. A traffic frame may be a speech frame as such but mostly additional bits are needed for different purposes for the transmission in which case the length of the frame is greater than the length of a mere speech frame. The provided traffic frame as a whole is inserted immediately in the payload part of the data packet and the data packet is sent via the transmission network to the destination. At the destination the traffic frame is separated from the payload of the received packet and it is passed to the speech decoder for restoring the original digitalized speech signal. According to the preferred embodiment, the transmission network is an ATM network in which case the packet is an ATM cell.

According to claim 4 the transmission link is provided by a packet network which transmits a call between base stations and a transcoder of the mobile communication network.

Other information may be inserted, when desired, in the payload portion of the packet/cell that has remained free, for example information needed for identifying the call in the uplink direction which can be used for directing ATM cells associated with the call in the MSC.

The advantages of the invention are first of all reduced transmission delay in the network and secondly, the transmission of one call in one ATM cell enables ATM switching of the cells and thus directing the call into the desired destination. This results in a genuine ATM telephone network. Thirdly, the transmission of the call in one ATM cell makes it possible that after the call has been terminated, the transmission of the cell also ends, which is contrary to when circuit switching is emulated. Fourthly, the cells need to be sent during breaks in speech only when noise parameters are transmitted. Transmission capacity is thus released for other use during breaks.

BRIEF DESCRIPTION OF THE DRAWINGS

The invention will now be explained in more detail in association with one preferred embodiment with reference to the appended drawings where.

PREFERRED EMBODIMENTS OF THE INVENTION

Figure 1:
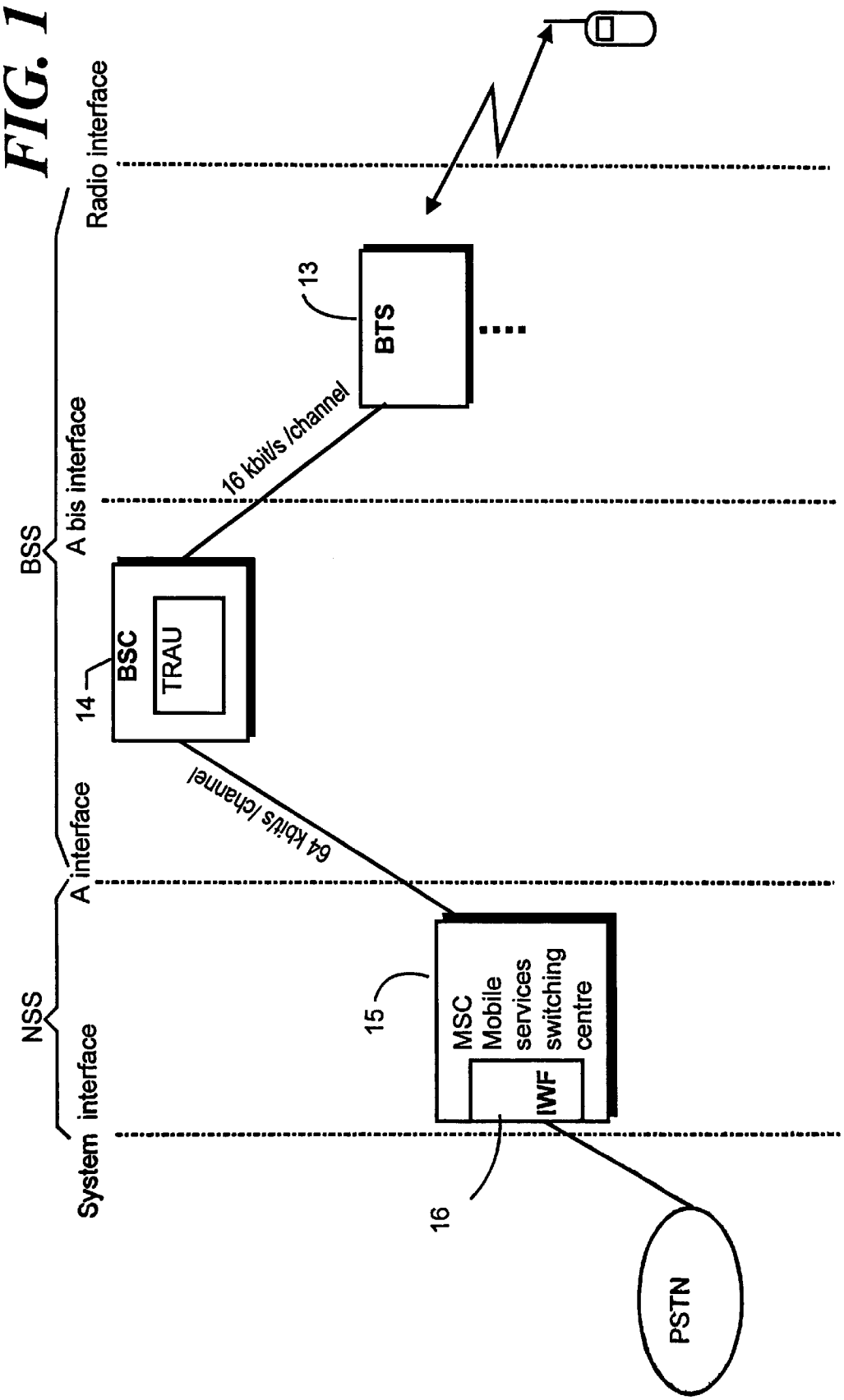
FIG. 1 shows a simplified view of the mobile communication network.
Figure 2:
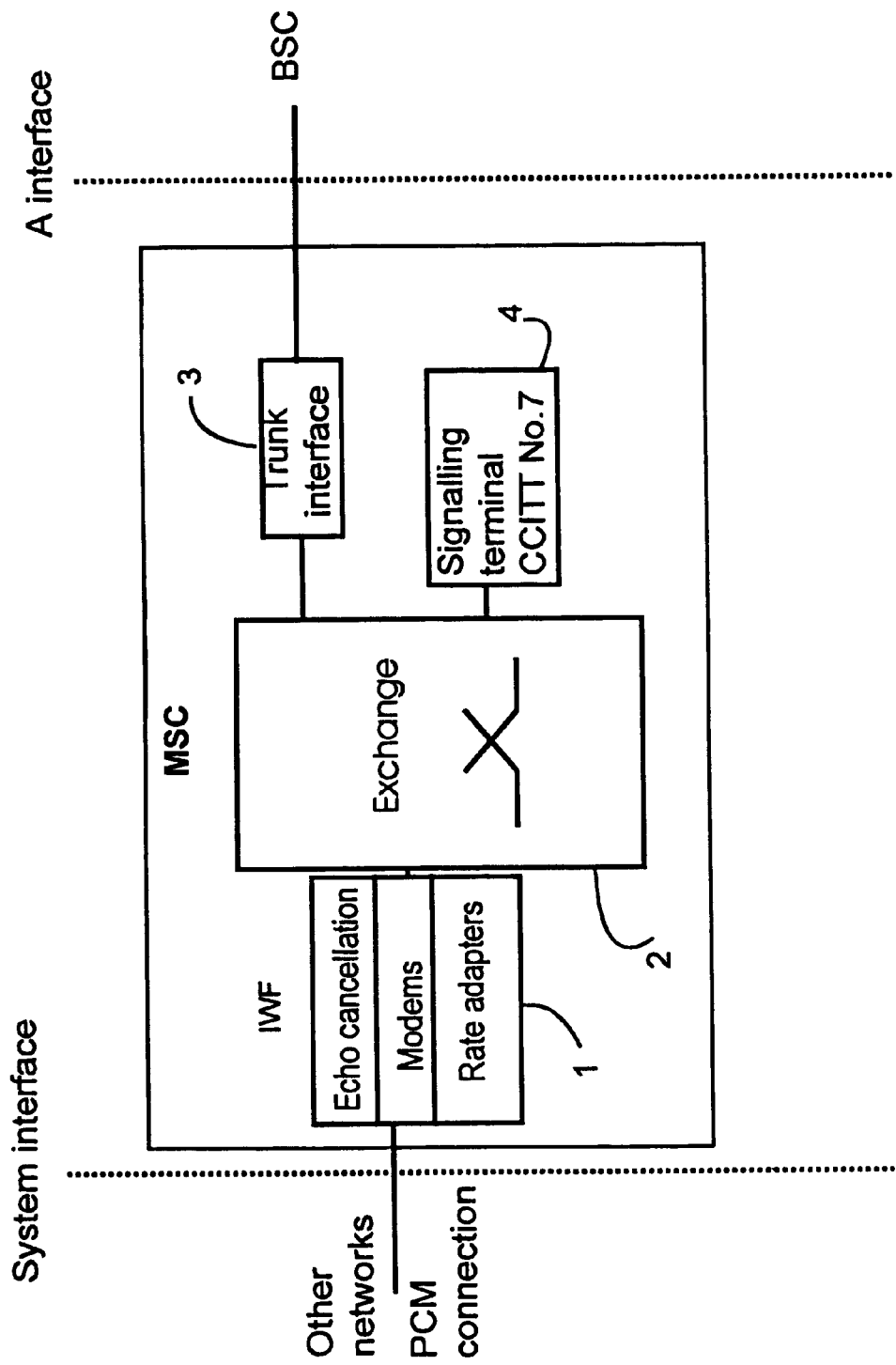
FIG. 2 shows the functional parts of a mobile services switching centre.

The PCM connection between TRAU and base stations described in FIG. 1 is replaced with an ATM connection. Because the TRAU can be physically situated in association with a base station controller or a mobile services switching centre, in practice it means that all the PCM connections of the present mobile services switching centre are replaced with ATM connections.

Figure 3:
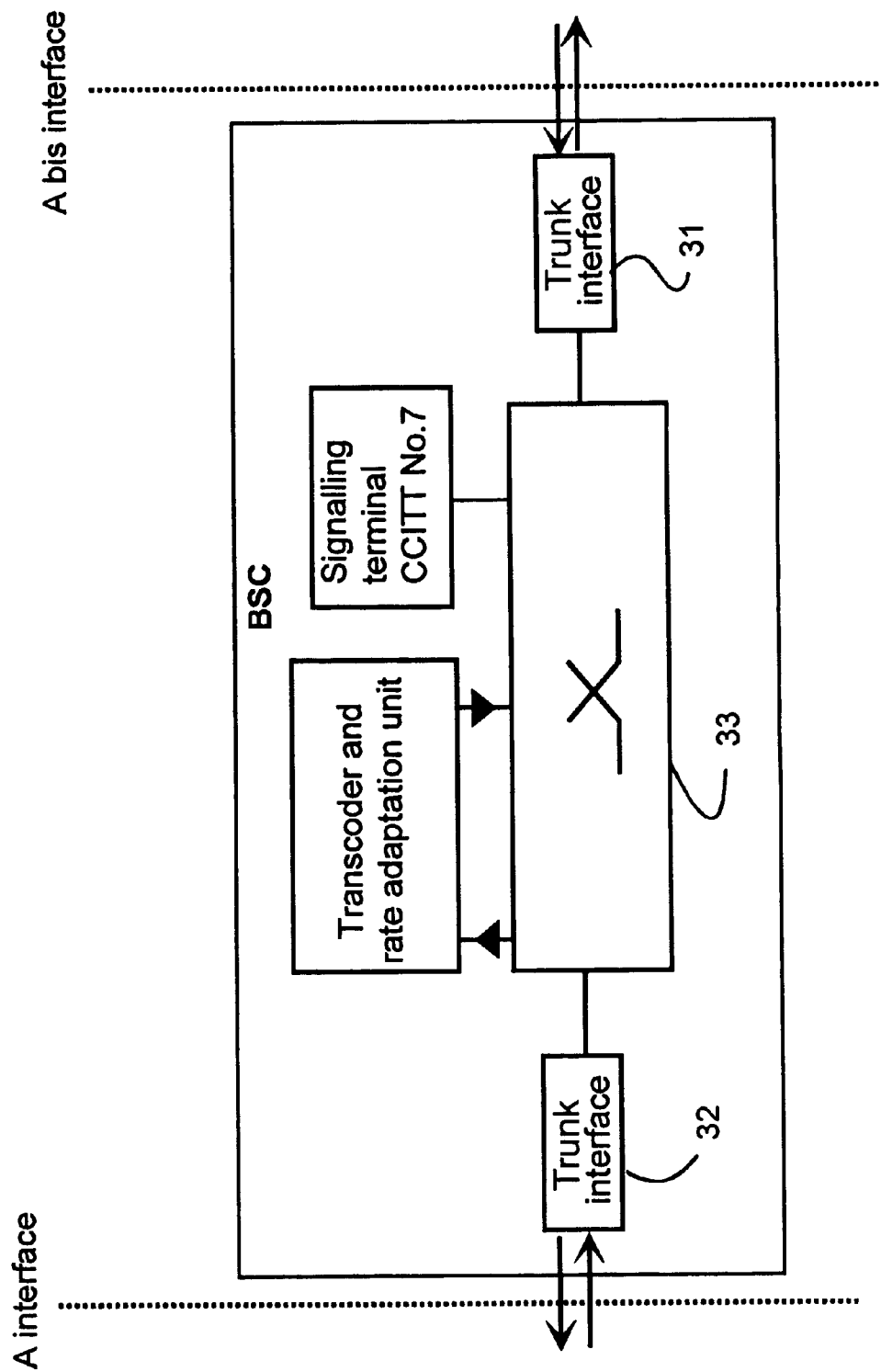
FIG. 3 shows the functional parts of a base station controller.

In the next example it is assumed that the TRAU is located in association with a base station controller as disclosed in FIG. 3 but it should be noted that the physical location of the TRAU is not essential for the invention.

Figure 4:
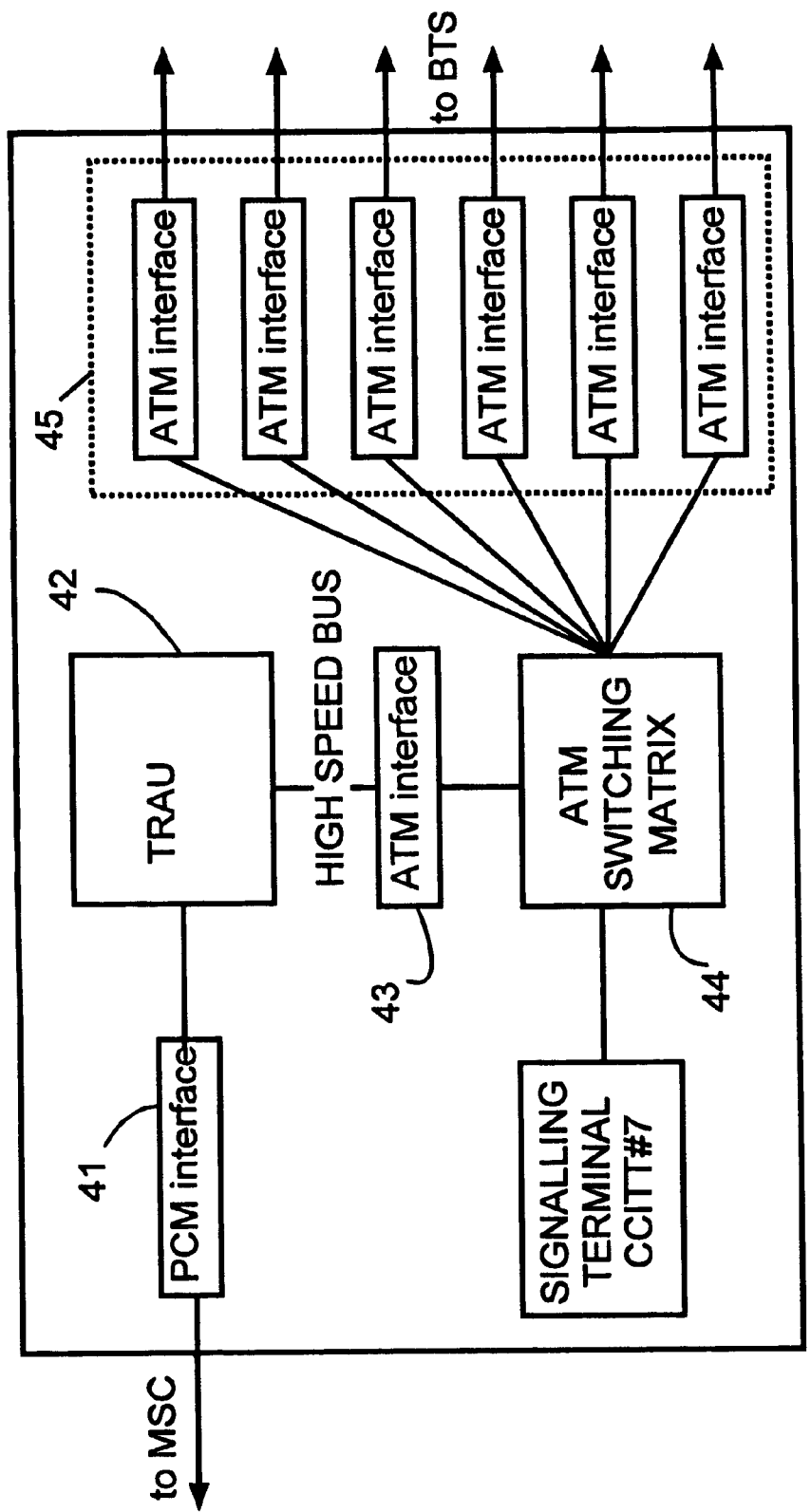
FIG. 4 shows a base station controller having arrangements according to the invention.

With reference to FIG. 4, the method of the invention is explained from the point of view of the TRAU. When PCM encoded speech is received from the direction of the mobile services switching centre on the speech channel assigned to the TRAU, it is directed via a PCM interface block 41 to the TRAU 42 which forms of the incoming PCM audio signals traffic frames of 316 bits similarly as in the system of the prior art. As soon as a traffic frame has been formed, it is directed via a high-speed bus to an ATM adaptor 43 which inserts the frame as such in the payload part of the ATM cell. As this part is of a constant length, 48 bytes (384 bits), the available space will not be completely filled but there is free space for other purposes. The adaptor 43 inserts the necessary address information in the headers of the cell so that an ATM switching matrix 44 is able to direct the cell to the appropriate ATM interface of an ATM interface group 45 at the output side and thus to the correct physical connection and to the destined base station.

If there is only one outgoing physical downlink connection towards the ATM network, no switching matrix would be needed at all and only one ATM card 45 would be required.

The transmission of a cell to the base station is very fast. Nowadays when a traffic frame is transmitted two bits at a time in time slots of the PCM line of 2 Mbit/s at a rate of 16 kbit/s, the transmission of a frame between the TRAU and the base station takes about 20 ms. When using the same physical line but ATM protocol, the transmission takes only about 0.2 ms.

When receiving traffic frames inserted in ATM cells and sent by the base stations, the mode of operation is evident from the foregoing. ATM cells are received from different physical lines and the switching matrix 44 switches the cells belonging to the same channel on the basis of the address in the successive order to the ATM adapter 43 that separates from each cell the payload, that is, the traffic frame sent by the mobile station and reassembled by the base station. The transcoder of the TRAU 42 starts to decode the traffic frame immediately after having received the traffic frame as a whole from the fast bus. The speech signal decoded into A-law standard mode is directed to the PCM interface block 41 which inserts the speech signal in the PCM time slot assigned to the connection to be transported further to the mobile services switching centre MSC.

The transporting distance is not long in the case that the TRAU is placed in association with the MSC and not in association with the base station controller as in FIG. 4. If all the trunk lines as well as the connections from the mobile services switching centre to the other networks are replaced with ATM connections and the exchange is realized by ATM technique, in the TRAU PCM-mode speech can be inserted directly in the ATM cell and transmitted further.

Figure 5:
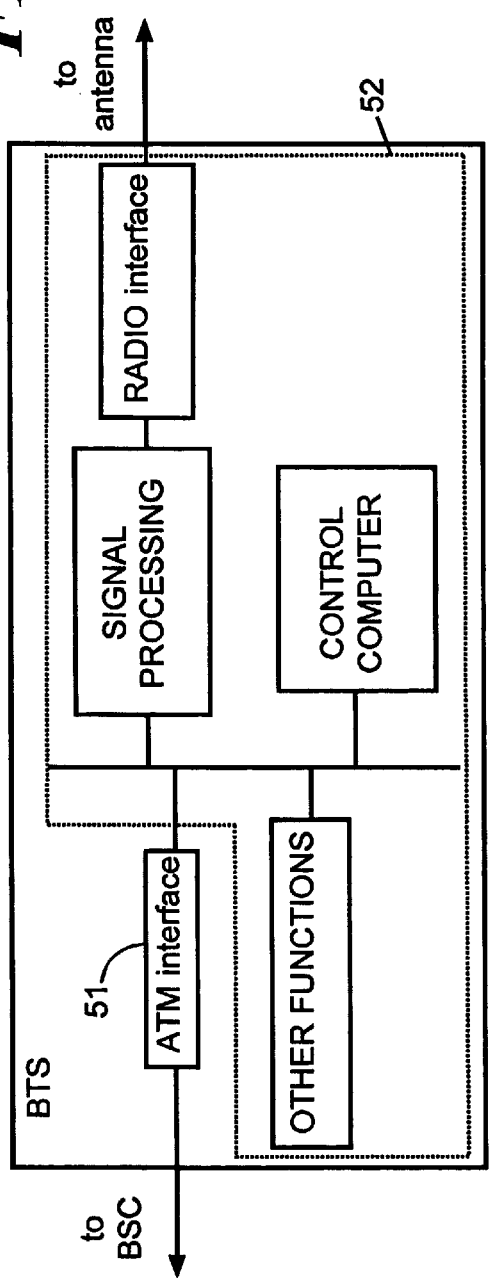
FIG. 5 shows the base station with an addition of the operation of the invention.

In the following, events are examined with reference to FIG. 5 at the other end of the connection, that is, at the base station. In the figure the blocks inside reference numeral 52 are blocks of a base station known per se and not as such essential for the invention and thus not necessary to be explained in the connection.

Various known operations are performed for the traffic frame formed by the mobile station before sending, as a result of which it is sent mixed and in small pieces over the radio path to the base station. The base station BTS receives the pieces over the radio interface and assembles the original traffic frame of them. As soon as it has assembled the frame, the frame is directed to the ATM interface block 51 which inserts the frame in the payload of the ATM cell, sets the required header information and sends the cell towards the TRAU. The transcoder starts to decode the frame sent in the cell as soon as it has been received in full. In order that the delay would be as small as possible, the connection between the ATM interface block 51 and the block (signal processing) assembling the traffic frame at the base station has to be very fast.

The method of the invention causes only very small delays in the transmission between the base station and TRAU. If the same base station has several ongoing calls and the transmission connection is an ATM transmission of 2 Mbit/s, the delay may at worst rise only as great as with the present method using PCM connection. The average delay is at worst only half of the delay at present and the probable delay is generally considerably smaller.

Figure 6:
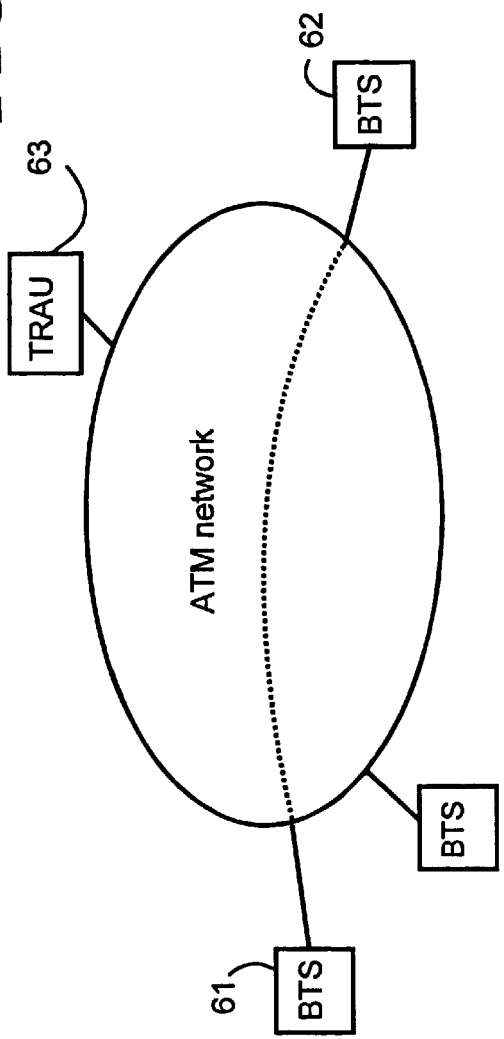
FIG. 6 shows a preferred transmission path between two base stations.

The transmission of speech information via the ATM network according to the method enables the generation of a direct speech connection between two base stations. Referring to FIG. 6. In conventional networks a speech connection between two mobile stations passes via the TRAU and the mobile services switching centre. In the method of the invention the connection between base stations, e.g. BTS 61 and BTS 62 can be implemented directly by placing the header of the receiving base station as the address of the ATM cell containing the traffic frame, in which case the connection need not pass via the TRAU 63. The mobile communication network has naturally informed the base stations in advance by means of signaling connections where the packets are to be sent and which calls the packets are associated with. This possibility will relieve the loading the network and accelerate the connection and improve speech quality as successive encoded speech—PCM speech—encoded speech need not be carried out.

It will be evident to those skilled in the art that the basic idea of the invention may be realized in various ways. The invention and its embodiments are therefore not restricted to the examples described above but they may vary within the scope of the claims.

What is claimed is:

1. A digital mobile communication network comprising:
a switching system comprising
an asynchronous transfer mode switching matrix associated with several switching interfaces for transmitting and receiving asynchronous transfer mode cells to and from at least one base station over an asynchronous transfer mode transmission network;
a pulse code modulation interface for receiving and transmitting pulse code modulated speech signals from and to a pulse code modulation link;
a transcoder unit, separated from the asynchronous transfer mode switching matrix, for converting a pulse code modulated speech signal into speech coding parameters which are inserted in downlink speech traffic frames, and for converting received uplink speech traffic frames into a pulse code modulated speech signal to be transmitted over said pulse code modulation link; and
an asynchronous transfer mode adapter, separated from the asynchronous transfer mode switching matrix and the transcoder unit and interconnecting said transcoder unit and said asynchronous transfer mode switching matrix, said asynchronous transfer mode adapter inserting said downlink speech traffic frames from said transcoder unit into payloads of said asynchronous transfer mode cells and forwarding said asynchronous transfer mode cells to said asynchronous transfer mode switching matrix, and said asynchronous transfer mode adapter extracting uplink speech traffic frames from payloads of asynchronous transfer mode cells from said asynchronous transfer mode switching matrix and forwarding said uplink speech traffic frames to said transcoder unit,
said asynchronous transfer mode switching matrix switching asynchronous transfer mode cells from said asynchronous transfer mode adapter to said asynchronous transfer mode interfaces for transmission of said asynchronous transfer mode cells to said at least one base station, and said asynchronous transfer mode switching matrix switching asynchronous transfer mode cells received from said asynchronous transfer mode interfaces to said asynchronous transfer mode adapter; and
at least one base station which receives uplink speech traffic frames containing speech coding parameters from mobile stations over a radio path, inserts uplink speech traffic frames as such in payloads of asynchronous transfer mode cells and transmits asynchronous transfer mode cells to said switching system over said transmission system, and which sends downlink speech traffic frames received in payloads of asynchronous transfer mode cells from said switching system the transmission link further to a destined mobile station over the radio path.

2. A network according to claim 1, wherein a destination indicated in a header of each asynchronous transfer mode cell transmitted to said switching system by the base station is an address of the transcoder unit, whereby the transmission link is provided between the base station and the transcoder unit.

3. A network according to claim 1, wherein a destination indicated in a header of each asynchronous transfer mode cell sent to said transmission system by the base station is an address of another base station, whereby a transmission link is provided directly between the base stations.

4. A network according to claim 1, wherein, if the length of the traffic frames is smaller than a field allocated to the payload in at least one of the asynchronous transfer mode cells, other information is inserted in the field left free.

5. A network according to claim 4, wherein the other information is information associated with call control.

6. A switching system for a digital mobile communication network comprising:

an asynchronous transfer mode switching matrix associated with several switching interfaces for transmitting and receiving asynchronous transfer mode cells to and from at least one base station over an asynchronous transfer mode transmission network;

a pulse code modulation interface for receiving and transmitting pulse code modulated speech signals from and to a pulse code modulation link;

a transcoder unit, separated from the asynchronous transfer mode switching matrix, for converting a pulse code modulated speech signal into speech coding parameters which are inserted in downlink speech traffic frames, and for converting received uplink speech traffic frames into a pulse code modulated speech signal to be transmitted over said pulse code modulation link; and an asynchronous transfer mode adapter, separated from the asynchronous transfer mode switching matrix and the transcoder unit and interconnecting said transcoder unit and said asynchronous transfer mode switching matrix, said asynchronous transfer mode adapter inserting said downlink speech traffic frames from said transcoder unit into payloads of said asynchronous transfer mode cells and forwarding said asynchronous transfer mode cells to said asynchronous transfer mode switching matrix, and said asynchronous transfer mode adapter extracting uplink speech traffic frames from payloads of asynchronous transfer mode cells from said asynchronous transfer mode switching matrix and forwarding said uplink speech traffic frames to said transcoder unit, said asynchronous transfer mode switching matrix switching asynchronous transfer mode cells from said asynchronous transfer mode adapter to said asynchronous transfer mode interfaces for transmission of said asynchronous transfer mode cells to said at least one base station, and said asynchronous transfer mode switching matrix switching asynchronous transfer mode cells received from said asynchronous transfer mode interfaces to said asynchronous transfer mode adapter.

* * * * *

UNITED STATES PATENT AND TRADEMARK OFFICE
CERTIFICATE OF CORRECTION

PATENT NO.     : 6,542,501 B1                                           Page 1 of 1
DATED          : April 1, 2003
INVENTOR(S)    : Tikka It is certified that error appears in the above-identified patent and that said Letters Patent is hereby corrected as shown below:

<u>Title page,</u>
Item [56], References Cited, FOREIGN PATENT DOCUMENTS, please add:
-- EP   660 625   06/1995 --

Signed and Sealed this

Thirteenth Day of May, 2003

JAMES E. ROGAN
*Director of the United States Patent and Trademark Office*